May 13, 1958  H. OTT  2,834,642
MOUNTINGS FOR MEASURING ROLLERS OF PLANIMETERS
OR SIMILAR INSTRUMENTS
Filed Sept. 28, 1954   2 Sheets-Sheet 2

Inventor
Hermann Ott
By Gustav W. Emery
Atty.

United States Patent Office 2,834,642
Patented May 13, 1958

2,834,642

MOUNTINGS FOR MEASURING ROLLERS OF PLANIMETERS OR SIMILAR INSTRUMENTS

Hermann Ott, Kempten, Germany

Application September 28, 1954, Serial No. 458,927

Claims priority, application Germany September 30, 1953

1 Claim. (Cl. 308—233)

This invention relates to a mounting for the measuring roller or integration roller of planimeters or similar instruments in which, after a figure of any desired shape has been circumscribed with a tracing point, the surface area or another integration value such, as for example, the static moment, moment of inertia, can be read off directly from the measuring or integration roller found on all circumscribing planimeters and mathematical instruments similar to planimeters.

Figure 1:
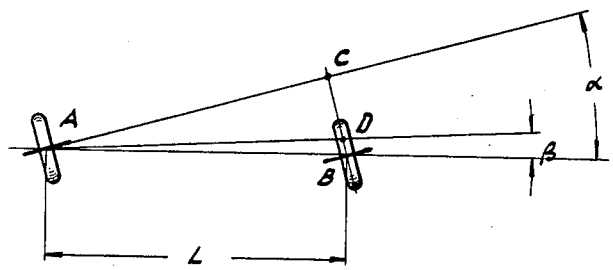
Figure 2:
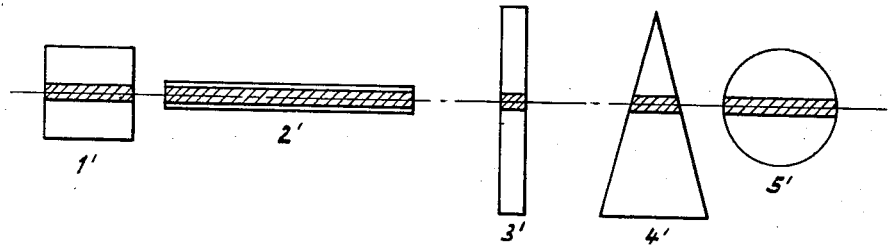
Figure 3:
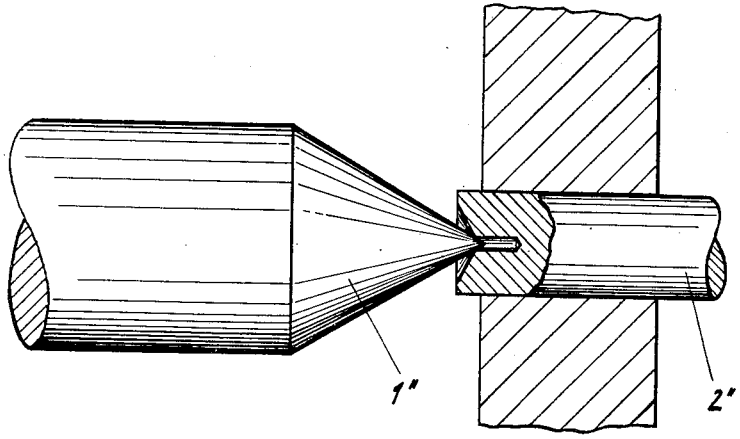
Figure 4:
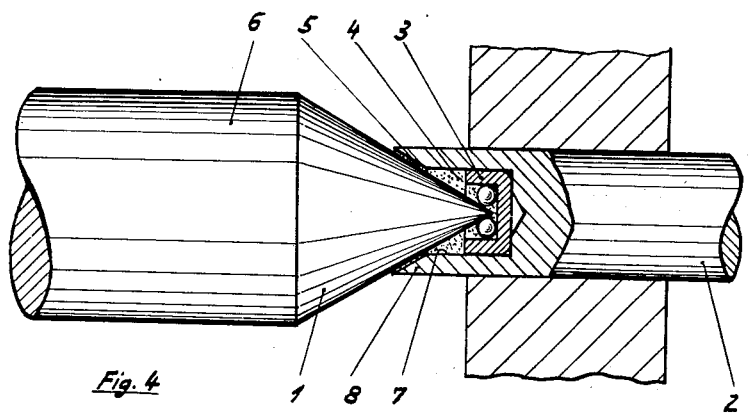
Figure 5:
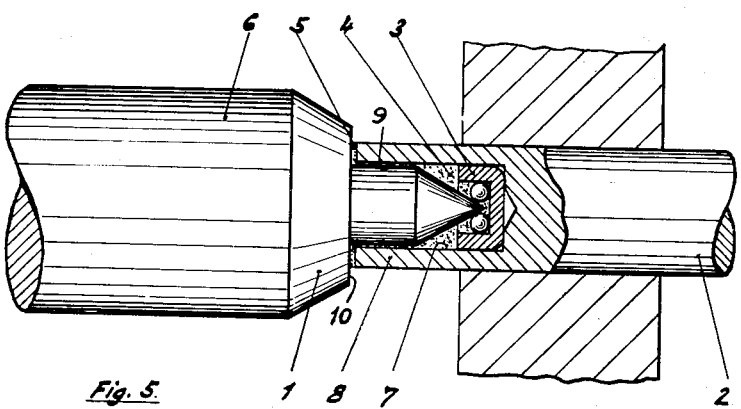
Figure 6:
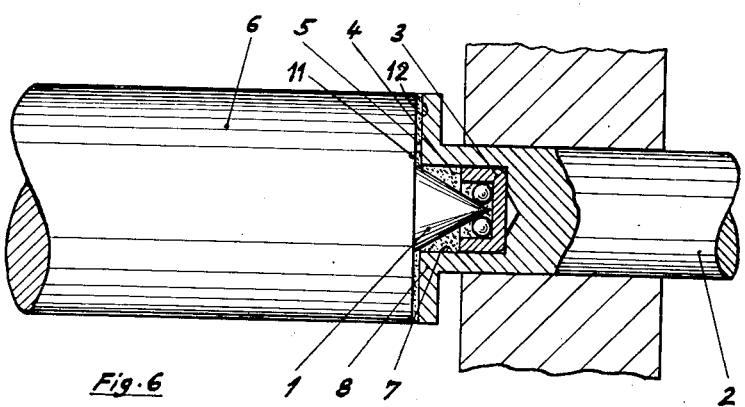

The invention will now be described with reference to the accompanying drawings in which, Fig. 1 is a geometrical diagram showing the amount of slip of the roller that may occur in known types of planimeters due to friction, Fig. 2 is a series of diagrams showing the fractional error which may be incurred when measuring different areas with a known type of planimeter, Fig. 3 shows the mounting of the roller spindle in known planimeters, and Figs. 4–6 show different embodiments of measuring roller spindle mountings according to the invention.

Fig. 1 of the drawings shows how, if a roller of the type stated is guided from point A to point B at an angle $\alpha$ to the direction of travel, the developed distance travelled by the roller would theoretically be as if the same had travelled from A to C without rolling at all, that is to say in a purly sliding movement, and then guided in rolling manner from C to B. The distance corresponding to rolling is therefore $CB = Lx \sin \alpha$. However, due to the fact that there is friction in the bearing, the measuring roller spindle reduces the effective rotating of the roller by a certain distance BD corresponding to, what may be termed, the angle of slip $\beta$ of the bearing due to friction. Hence the effective rolling only occurs from C to D.

Consequently the reading on the roller will be too small in these cases because a narrow surface area, indicated by the shading in the diagrams of Fig. 2, is not measured as a result of slip due to friction. The percentage of slip increases in proportion with the bearing friction when smaller surface areas are measured. Moreover, with figures of equal area the slip differs as shapes vary and position alters relatively to the path of the tracing needle. Fig. 2 illustrates several such figures: a square 1', a horizontal rectangle 2', a vertical rectangle 3', a triangle 4' and a circle 5'.

Hitherto point suspension has been used for the mounting of planimeter rollers, as is shown in Fig. 3 of the drawings. Here the conical apex 1" of the measuring roller spindle is mounted in a bearing pin 2", the friction in this type of mounting being dependent upon the size of the bearing bore.

If the bearing bores are very small, the errors in the measurements obtained are small for relatively large areas but become too great when small areas are measured. Furthermore, bearing friction alters, when the instrument has been in use for a fairly long period, as a result of alteration in the lubricant and of dust forming or of the bearing running dry, while there is a risk of the cone apices breaking off if the instrument is treated roughly.

It has already been proposed to mount the measuring rollers of planimeters in ball bearings, but the ball-bearing mounting hitherto known for this purpose also have disadvantages which are mainly due to the same causes as are found in known point suspensions and which are primarily faulty lubrication, dust formation or the like.

It is an object of the invention to obviate these disadvantages of the known device and to provide a measuring roller mounting which has very little friction and which is so lubricated that the slip due to friction remains substantially at a minimum for a very long period and is substantially independent of variations of temperature near room temperature. The risk of dust formation, and the risk of damage in transit is also diminished.

According to the invention there is provided a measuring roller spindle mounted in a ball-bearing characterised in that an annular gap of capillary size is formed between the measuring roller spindle which has a conical apex, and the bearing pin of the ball bearing.

In a particular embodiment of the invention the annular gap of capillary size is disposed between the edge of the conical apex and the cylindrical bearing pin wall extending beyond the ball bearing. A lubricating chamber expediently filled with a grease which is of very low viscosity and which is substantially independent of variations of temperature near room temperature is disposed between the ball bearing and the annular gap.

An embodiment of a mounting according to the invention is illustrated by way of example in Figure 4. Here the conical apex 1 of the measuring roller spindle 6 of a measuring roller (not shown) is mounted in a miniature ball bearing 3. The latter is recessed so deeply in a cylindrical bore 7 in a bearing pin 2 that the cylindrical wall 8 of the bore 7 extends up to the conical apex 1. At this point the cylindrical wall 8 is conically bevelled in such manner as to form with the conical surface of the conical apex 1 an annular gap of capillary size. A hollow space 4 is formed between ball bearing 3 and the annular gap 5 and is kept full of a grease which is of very low viscosity and which is substantially independent of variations of temperature near room temperature. A lubricant known as "silicone grease" has been found very suitable for this purpose.

The grease-filled annular gap 5 prevents dust from penetrating into the ball bearing and thus ensures that bearing friction, which is in any case reduced does not vary substantially.

The measuring roller mounting constructed according to the invention enables the planimeter to be used within permissible limits of tolerance even when measuring very small areas, the previous dependency of measurement accuracy upon the shape of the figure to be measured being more or less obviated. The annular gap 5 can be arranged in any other suitable position between the conical apex 1 or measuring roller spindle 6 and the projecting wall 8 of the bearing pin 2 or ball bearing casing.

In Figure 5, an elongated cylinder wall 8 of the bearing pin 2 co-operates with an axially extending cylindrical surface 9 on a step in the conical apex 1 or with an annular surface 10 on such a step or with the two surfaces 9 and 10 together in order to form an annular gap 5.

In Figure 6 the annular gap 5 is disposed between, on the one hand an annular end face 11 associated with the measuring roller shaft 6 and bearing a conical apex 1, and on the other hand, the annular end face 12 of the flange 8. It is also possible for the annular gap 5 to be disposed between the periphery of the measuring roller spindle 6 and a cylindrical rim on the flange 8 similar to the embodiment shown in Figure 5.

In all cases there is formed between the ball bearing 3 and capillary gap 5 a lubricant chamber 4 which ensures that the annular gap remains full of grease and prevents the penetration of dust between the relatively moving parts.

I claim:

A planimeter comprising a measuring roller in the form of a spindle having a conical apex on one end, and a fixed bearing pin having a cylindrical wall in a bore in one end extending to said conical apex and having a ball bearing in the inner end of the bore in engagement with the conical apex, the outer end face of the bore being conically bevelled forming a conical surface to cooperate with the conical apex as an annular gap of capillary size, the diameter of said bearing pin being smaller than the diameter of said spindle, said ball bearing being spaced axially from the conical surface of said bore to provide a space forming a grease chamber between said capillary gap and said ball bearing, and said grease chamber and said capillary gap being filled with a grease of very low viscosity.

References Cited in the file of this patent

UNITED STATES PATENTS

| | | |
|---|---|---|
| 1,346,400 | Dover | July 13, 1920 |
| 2,000,276 | Delaval-Crow | May 7, 1935 |
| 2,533,862 | Williams | Dec. 12, 1950 |
| 2,620,668 | Lundberg | Dec. 9, 1952 |

FOREIGN PATENTS

| | | |
|---|---|---|
| 220,852 | Great Britain | Aug. 28, 1924 |
| 274,768 | Great Britain | July 28, 1927 |